Jan. 21, 1936.　　　　　R. COWAN　　　　　2,028,501
ELECTRIC GAUGE
Filed April 18, 1932　　　4 Sheets-Sheet 1
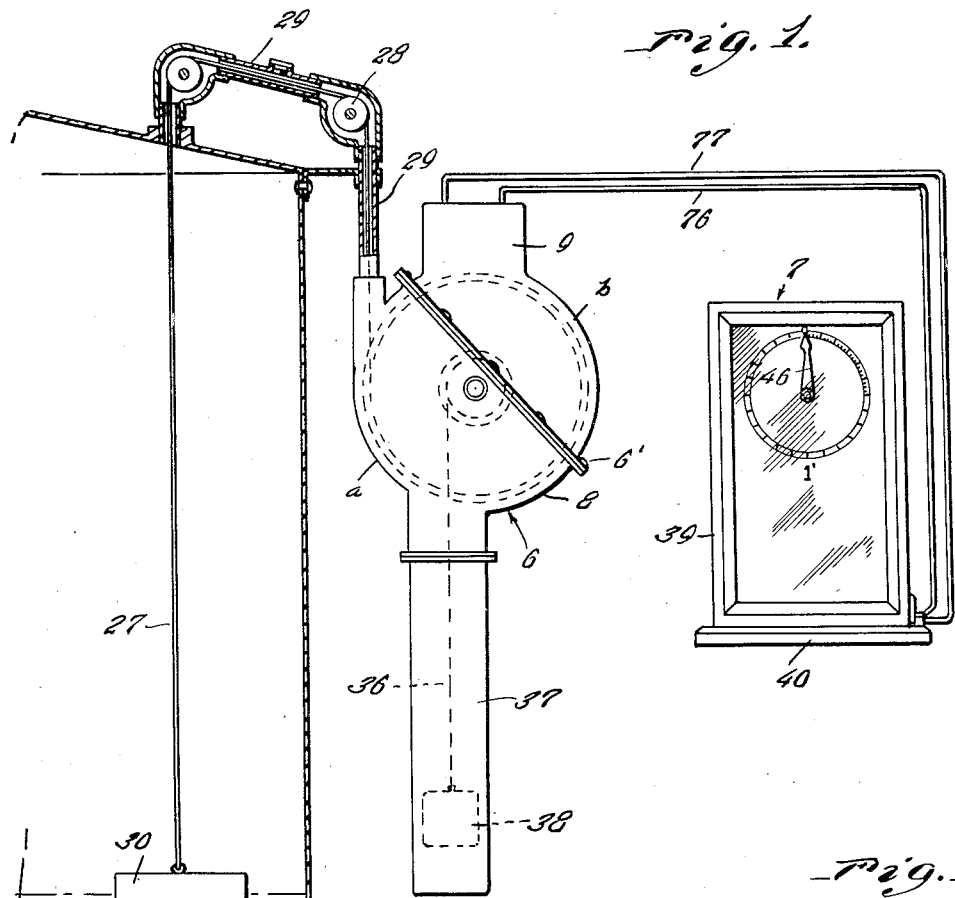
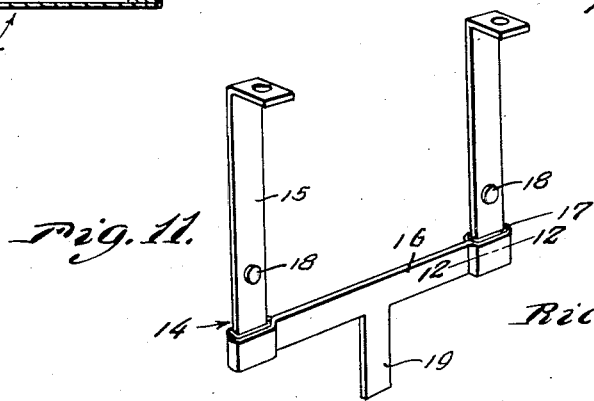
Inventor
Rich Cowan
By Clarence A. O'Brien
Attorney

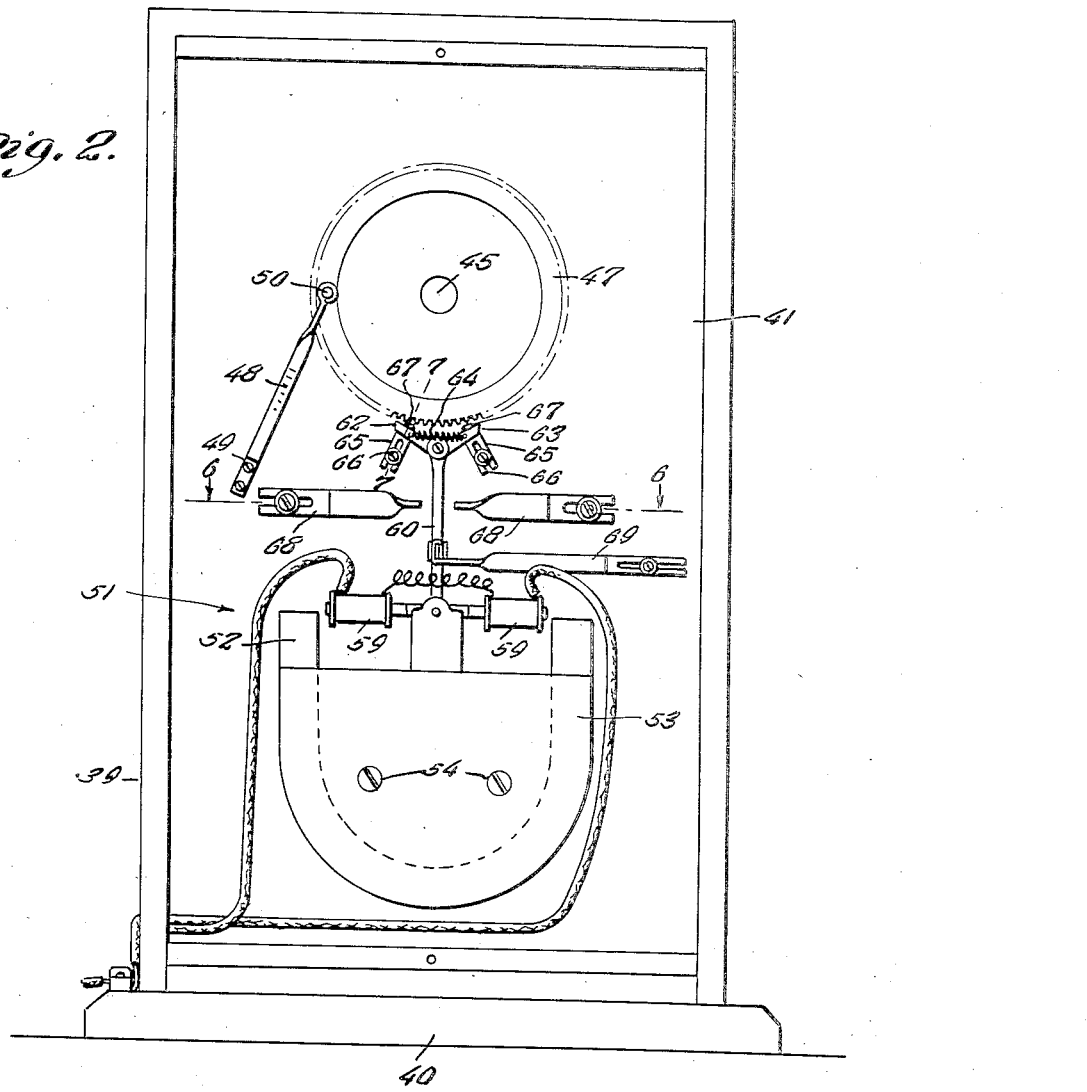
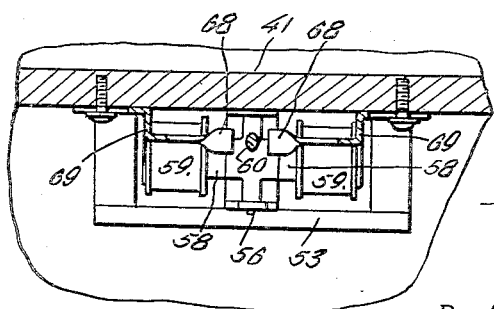

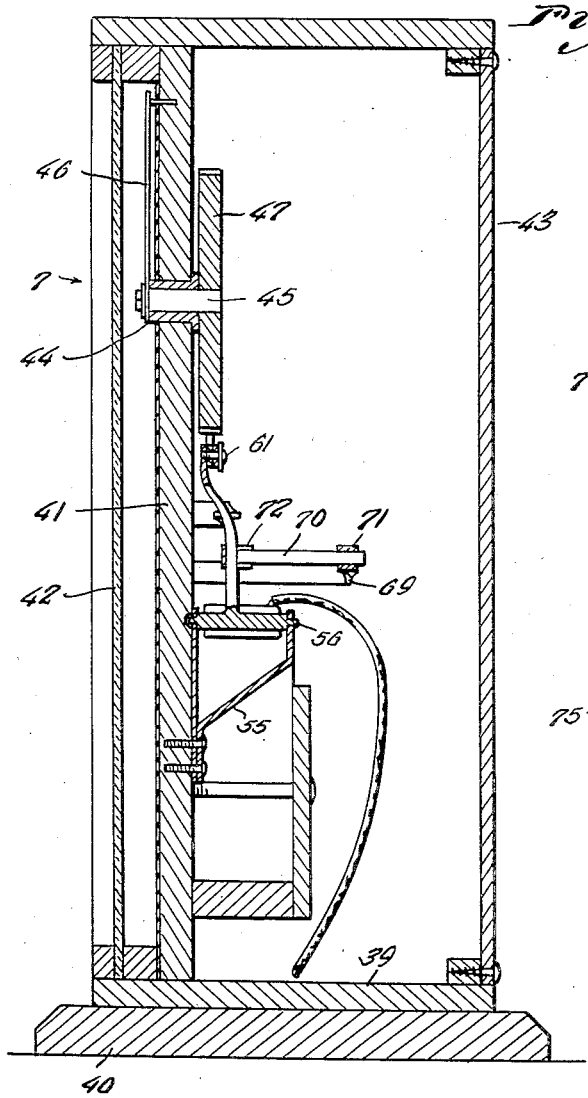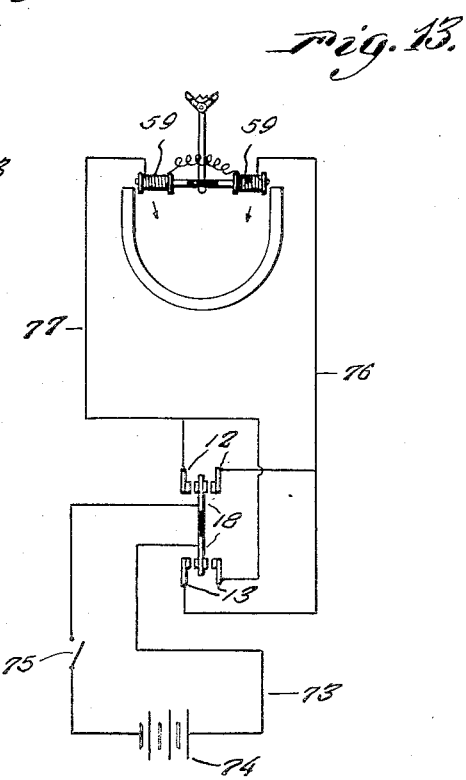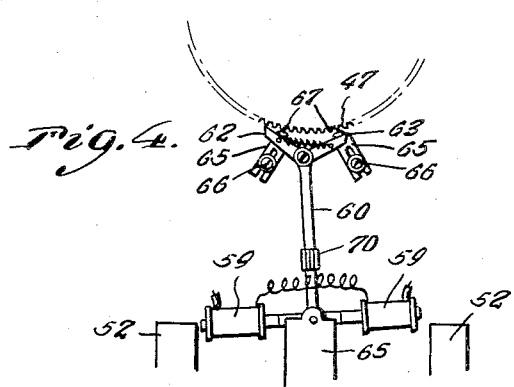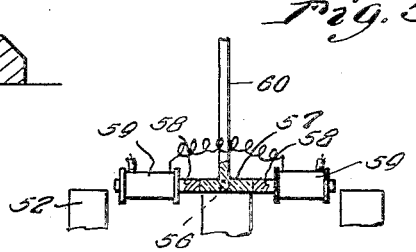

Jan. 21, 1936.  R. COWAN  2,028,501
ELECTRIC GAUGE
Filed April 18, 1932   4 Sheets-Sheet 4
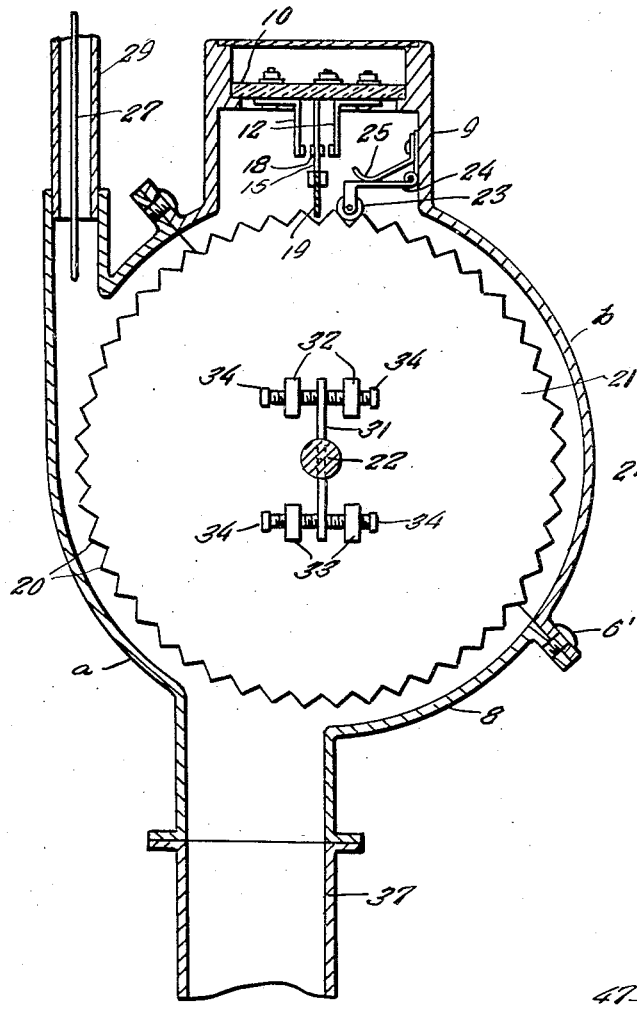
Fig. 8.
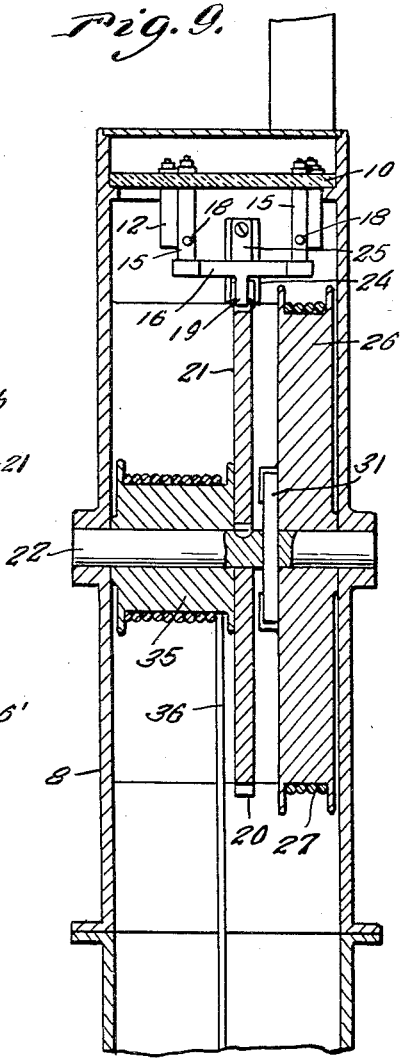
Fig. 9.
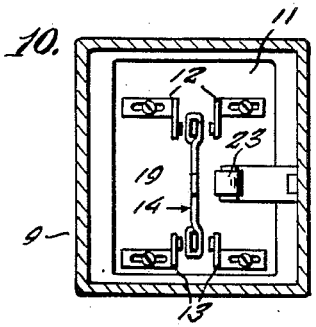
Fig. 10.
Fig. 7.
Inventor
Rich Cowan
By Clarence A. O'Brien
Attorney Patented Jan. 21, 1936

2,028,501

UNITED STATES PATENT OFFICE 2,028,501

ELECTRIC GAUGE

Rich Cowan, Comyn, Tex.

Application April 18, 1932, Serial No. 606,057

1 Claim. (Cl. 74—150)

This invention relates to new and useful improvements in electric registers and more particularly to a register of the electrical float controlled type.

The principal object of the invention is to provide a liquid gauge particularly adapted for use in conjunction with reservoirs such as contain gasoline, oil, or other fluids.

Another important object of the invention is to provide a gauge which will readily indicate varying capacity either on the increase or decrease.

These and numerous other important objects and advantages of the invention will become apparent to the reader of the following specification.

In the drawings:—

Figure 1 represents a diagrammatic view disclosing the invention in its entirety.

Fig. 2 represents a rear elevational view of the gauge with the back cover plate removed.

Fig. 3 represents a vertical sectional view through the gauge.

Fig. 4 represents a fragmentary detailed elevational view of the electro-magnetic ratchet means.

Fig. 5 represents a fragmentary detailed sectional view disclosing the electro-magnetic means.

Fig. 6 represents a fragmentary enlarged horizontal sectional view taken substantially on line 6—6 of Fig. 2.

Fig. 7 represents an enlarged fragmentary detailed sectional view taken substantially on line 7—7 of Fig. 2.

Fig. 8 represents a fragmentary enlarged detailed sectional view of the toothed switch controlling wheel and associated mechanisms.

Fig. 9 represents a vertical sectional view through the structure shown in Fig. 8.

Fig. 10 represents a horizontal sectional view through the upper portion of the structure shown in Fig. 8.

Fig. 11 represents a perspective view of the contactor of the switch.

Fig. 12 represents an enlarged fragmentary detailed sectional view taken substantially on line 12—12 of Fig. 11.

Fig. 13 represents a diagrammatic view disclosing the electrical connections between the electrical devices involved.

Referring to the drawings wherein like numerals designate like parts, it can be seen that numeral 5 generally refers to the container in which the fluid to be gauged is located, while numeral 6 generally refers to the transmitting or switching device, which is connected to the receiver or remotely located indicating gauge generally referred to by numeral 7.

As is clearly shown in Fig. 8, the switching mechanism 6 involves a cylindrical two part casing 8, the sections being denoted by a *a* and *b*. The section *b* is secured to the section *a* by suitable means *c* while the neck 9 extends upwardly from the section *b* and internally supports a di-electric plate 10 supporting the adjustable contacts 12—12 and 13—13, the contacts 12—12 being complementary and the contacts 13—13 being complementary respectively.

In Fig. 12, numeral 14 generally refers to the contactor which consists of a pair of spring brackets 15—15, secured to the aforementioned di-electric plate 11, so as to depend therefrom. A strap 16 bridges the lower ends of the bracket members 15—15, the ends of the strap 16 being insulated from the ends of the brackets 15 by suitable insulating material 17. Each of the bracket members 15 carries a contact 18 on each side thereof, and at the intermediate portion of the strap 16, depends a tongue 19 which is engageable with the teeth 20 on the disk 21. This disk 21 is carried by the shaft 22 which extends through the central portion of the housing 8, the tongue being so disposed as to permit the teeth to wipe against the same so as to flex the bracket members 15—15 to engage the contacts 18 with the corresponding contacts 12—13, regardless of which direction the disk 21 is rotated.

To always maintain the tongue 19 depending between a pair of teeth and in spaced relation to the disk 21, a roller 23 is carried by the swingable bracket 24 and has a leaf spring 25 bearing against the same, to always maintain the roller urged between the pair of the teeth 20 on the disk 21. Obviously, when the roller 23 is engaged in the position shown in Fig. 8, the disk 21 is so positioned, that the tongue 19, while disposed between a pair of teeth, is not touching the teeth, nor the disk 21, thereby maintaining the transmitting circuit broken.

As is shown in Fig. 9, a large drum 26 is located on the shaft 22 and on this drum 23 is wound the cable 27 which extends upwardly through the conduit 29 and over the pulleys 28 therein, to depend into the tank 5 where it is attached to the float 30.

As is clearly shown in Fig. 8, the shaft 22 is provided with an opening extending transversely therethrough to receive the leaf spring 31. On the adjacent side of the drum 26 are two pairs of lugs 32—32 and 33—33, these lugs being in these two complementary groups, and each provided with a set screw 34. These set screws bear against the ends of the spring 31 in the manner shown in Fig. 8, so that proper adjustment can be made to insure exactness in position between the disk 21 and the shaft 22 with respect to the switching means disclosed above the disk 21.

On the shaft 22 of the drum 26 is a smaller drum 35 which has a cable 36 wound thereon. This cable 36 extends downwardly in the barrel 37 which depends from the lower section a of the housing 8 where it is equipped with a counterweight 38.

Reference will now be made to the receiver or gauge device generally referred to by numeral 7 and in Fig. 1, it will be seen that the same involves the construction of a casing 39 supported upon the base 40 and having a front panel 41 fronted by a pane of glass 42. The back of this casing 39 is provided with a removable plate 43 and as is clearly shown in Fig. 3, the panel 41 has an opening therein through which the bushing 44 extends. In this bushing 44 operates the stub shaft 45 which at the front side of the panel 41 is equipped with the indicating hand 46. The opposite end of the stub shaft 45 is provided with a ratchet wheel 47.

It is of course to be understood, that this shaft 45 can be geared down or geared up to operate indicating hands to denote various other readings, either in regard to volume, depth or other measurements.

As is clearly shown in Fig. 2, numeral 48 represents a leaf spring anchored as at 49 to the rear side of the panel 41 and this at its free end is provided with a brush 50 or some other element for frictional engagement with the ratchet wheel 47, so that the ratchet wheel 47 will not be free to rotate independently of the ratchet mechanism shown beneath the ratchet wheel in Fig. 2.

Numeral 51 represents the electromagnetic means cooperating with the ratchet wheel 47 and indicating hand 46 and consists of the horse shoe magnet 52 secured to the panel 41 by the di-electric plate 53 and tie bolts 54. A bracket 55 (see Fig. 3), supports the magnetic coil, in that a pin 56 extends through the di-electric intermediate section 57 of the armature which has the core sections 58—58 extending therefrom and upon each of which is an electro-magnetic coil 59 each opposed to one pole of the aforementioned horse shoe magnet 52.

An arm 60 extends upwardly from the di-electric section 57 and has a pin 61 at its upper end swingably supporting a pair of pawls 62—63 which are connected together in the upwardly diverged position shown in Fig. 2 by the coiled spring 64. Numeral 65 represents slotted plates slidable on the screws 66. Each of these plates 65 is equipped with an outstanding lug 67 and each of these lugs 67 forms a fulcrum for a pawl 62 or 63.

Obviously, when the coils 59 rock and the arm 60 oscillates, the corresponding pawl 62 or 63 yielding with the tension of the spring 64 and against its corresponding fulcrum lug 67 will engage the ratchet wheel 47 and move the ratchet wheel the distance of one tooth.

Numerals 68—68 represent adjustable stops for the arms 60, while numeral 69 represents an adjustable bracket extending outwardly from the rear side of the panel 41. The outer end of this bracket 69 has a leaf spring 70 anchored thereto as at 71. The other end of the leaf spring 70 is rigidly secured as at 72 to the intermediate portion of the arm 60. Thus the arm 60 is normally under tension to obviously equalize the position of the coils normally between the poles of the magnet 52.

It can now be seen in Fig. 13, that the battery circuit 73 includes the battery 74, the manual switch 75 and the contacts 18—18 which are insulated from each other as shown in Figs. 7 and 12.

Numeral 76 represents the circuit for one of the coils 59 while numeral 77 represents the circuit for the other coil, and obviously, when the wheel 21 ceases operating in one direction, to engage for instance the contacts 12—13 on the left in Fig. 12, and the wheel 21 rotates in the opposite direction, when the tank 5 is being filled and the level of the fluid in the tank changes, the contacts 18—18 will engage the remaining contacts 12—13, on the right in Fig. 13 for reversing the circuit to the coils 59—59, to simply change the polarity thereof, so that the coils and the arms 60 will be rocked to the opposite direction for obviously feeding the ratchet wheel 47 in the opposite direction.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

Feed means for ratchet wheels comprising a pair of pawls, means for swingably mounting the pawls adjacent a wheel for engagement therewith, adjustable fulcrums for the said pawls, said fulcrums each consisting of a slotted plate, a member disposed through the slot of the plate for tightening the plate against a suitable support, and a spring connecting said pawls together and tensionally urging the same toward the wheel, each of said plates being provided with a lug against which said pawls fulcrum.

RICH COWAN.